Oct. 30, 1956    J. O. GRAYBEAL    2,769,113
SELF-BAKING ELECTRODE
Filed Sept. 18, 1951    3 Sheets-Sheet 1

INVENTOR.
JOHN O. GRAYBEAL
BY
James E. Tooney
ATTORNEY

INVENTOR.
JOHN O. GRAYBEAL

Oct. 30, 1956  J. O. GRAYBEAL  2,769,113
SELF-BAKING ELECTRODE
Filed Sept. 18, 1951  3 Sheets-Sheet 3
FIG. 3.
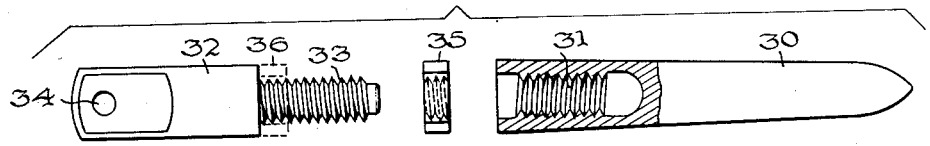
FIG. 4.
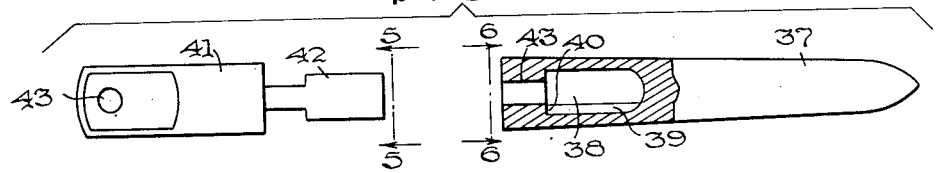
FIG. 5. 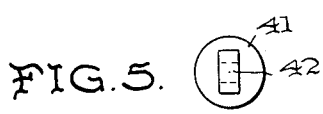    FIG. 6.
FIG. 7.
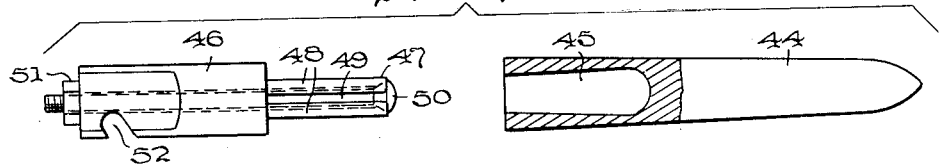
FIG. 8.
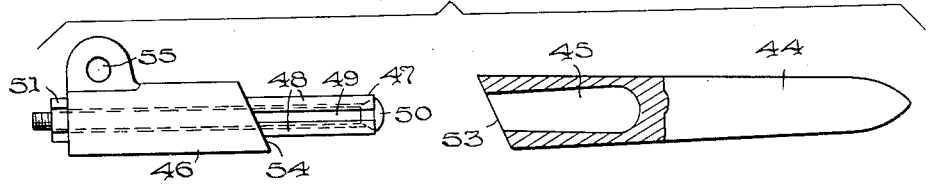
FIG. 9.
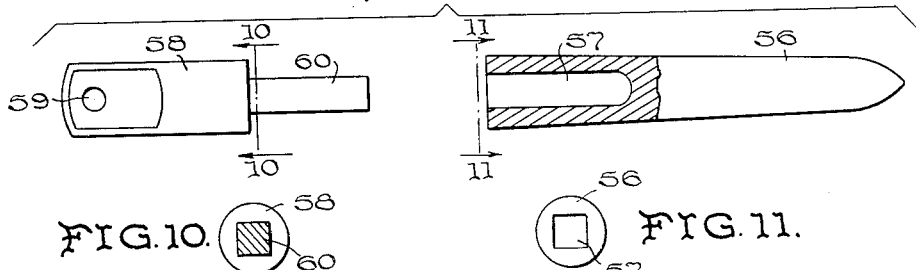
FIG. 10. 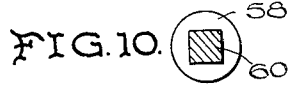   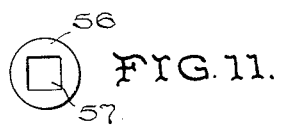 FIG. 11.
INVENTOR.
JOHN O. GRAYBEAL
BY James E. Tooney
ATTORNEY

United States Patent Office

2,769,113
Patented Oct. 30, 1956

2,769,113

SELF-BAKING ELECTRODE

John O. Graybeal, Buckley, Wash., assignor to Kaiser Aluminum & Chemical Corporation, Oakland, Calif., a corporation of Delaware Application September 18, 1951, Serial No. 247,146

7 Claims. (Cl. 313—327)

This invention relates to electric furnaces employing electrodes of the continuous or self-baking type, and more particularly relates to an improved suspension means for a continuous electrode employed in an electric furnace for use in the electrolytic production of aluminum from alumina.

Heretofore continuous electrodes employed in electric furnaces have been suspended by means of contact plates exerting sufficient pressure on the sides of the electrode to support the weight thereof, and later by means of contact studs inserted into the electrode mass either vertically or horizontally, the contact studs serving the dual function of supporting the electrode by connection of suitable suspension means to the contact studs, and further serving to conduct electrical current to the baked electrode mass. In the so-called horizontal contact stud type of suspension it is necessary to insert the contact stud into the upper portion of the electrode mass which is yet unbaked by the heat of the furnace. According to prior practice, a substantial portion of the stud is left outside the electrode mass so that the necessary connections for subsequent electrode suspension and electrical current conduction may be accomplished. As the lower portion of the electrode is consumed in operation of the furnace, it becomes necessary to successively lower the continuous electrode with its contained protruding contact studs. Accordingly, complex suspension means to allow successive movement of the electrode have been devised, such as the open framework structure formed of alternating beams as disclosed in Torchet Patent No. 2,073,356, which beam structure is constructed to allow successive removal of the lowermost row of alternating beams and for the replacement thereof in superimposed position on the open-frame structure after additional contact studs have been inserted in the unbaked portion of the electrode mass. It has also been proposed to eliminate the open-frame structure and replace the beams by channels contiguously arranged as disclosed in Legeron Patent No. 2,169,563. The contiguous arrangement of such channels as disclosed in said Patent 2,169,563 was made possible by the placement of suitable holes in the channels for insertion of the contact studs therethrough. In the suspension means of both Patent No. 2,073,356 and Patent No. 2,169,563, the electrode is supported through the contact studs which in turn rest on the beam or channel, the beam or channel being in turn suspended from suitable suspension means mounted on the furnace frame. To accomplish the successive lowering of the electrode with either suspension and electrode encompassing means, it is necessary to remove the lowermost row of beams or channels and replace said row in upper position in the frame structure. Another attempt to simplify the suspension means for the so-called horizontal contact stud system is disclosed in Sem Patent No. 2,159,183 wherein a stationary mold or casing is provided for the continuous electrode, the vertical movement of the contact studs being provided for by vertically arranged slots in the stationary casing. Aside from structural weaknesses inherent in such a slotted arrangement, the tendency for the unbaked portion of the electrode to deform and extrude through the slots necessitates the use of a relatively thick inner casing movable with the electrode. Other arrangements known to the art embody a permanent casing for the electrode with a cut-out portion to allow for insertion and movement of the contact studs, such as is disclosed in Hagerup-Larssen, Patent No. 2,339,230, and British Patent No. 608,475. These arrangements, embodying a stationary casing with large cut-out portions, likewise necessitate the employment of a relatively thick movable inner casing to resist extrusion and deformation of the unbaked portion of the electrode.

It is an object of this invention to present an improved arrangement of casing and suspension means for continuous electrodes employed in electric furnaces.

It is a further object of this invention to present improvements in electric contact studs for use with continuous electrodes employed in electric furnaces.

It is a further object of this invention to provide an improved arrangement of electric contact studs in a continuous electrode by use of which the employment of a strong stationary casing and the minimization of deformation and extrusion of the unbaked portion of the continuous electrode are made possible.

It has been found that the electric contact studs utilized in the so-called horizontal suspension system may be sectionalized so as to remove the necessity for a movable beam or channel structure and remove the necessity for employing slotted or large cut-out sections in the stationary casing. Accordingly, the electric contact studs are sectionalized so that the inner end portion which is to be baked in the electrode mass may be inserted at a point sufficiently high in the unbaked portion of the electrode mass so that the lateral pressure of said unbaked portion is relatively small. By such arrangement, the inner section of the electric contact stud being baked in position during downward travel of the electrode is contained wholly within the stationary casing. The stationary casing consequently remains unbroken in areas of its surface where a relatively high lateral pressure of electrode mass is encountered. According to this invention, the stationary casing can remain unbroken along the line of contact stud inner section travel from just below the point of insertion of the contact stud inner section to a point where the electrode is fully baked and the contact stud inner section firmly baked therein. Under operating conditions, downward movement of the electrode mass will cause a row of baked-in stud sections to emerge below the permanent casing a sufficient distance so that the corresponding outer section of the studs may be connected thereto, in turn making it possible to reconnect the bus bars to the new row of studs whereon the lowermost row of studs are removed in the conventional manner.

Aside from the advantages of a stronger stationary casing of simpler construction and the greatly reduced tendency for the electrode mass to deform during operation of an electric furnace self-baking electrode suspension arrangement embodying the present invention, it will be seen that substantial savings in materials necessary for electric contact stud and beam or channel construction are accomplished. The saving in amount of material needed for contact studs arises from the fact that only two rows of outer stud sections per furnace are necessary whereas by the former practice complete studs were required for each row. Where beams or channels have been previously employed, operational advantages in the form of reduced change-over time are realized since the necessity for handling heavy beams or channels is eliminated.

In order to illustrate specific examples of the invention, reference is made to the accompanying drawings which are schematic in character and partly in section, with various details of the furnace which are known to the art omitted for the sake of clarity of illustration.

Figure 3 is an expanded side view partially in section of one form of sectional contact stud employed, wherein the connection means between the inner and outer contact stud sections constitute thread means and locking nut therefor.

Figures 4, 5 and 6 illustrate another form of connection means between the inner and outer stud sections wherein the connection means is of the bayonet or key type, Figure 4 being an expanded side view partially in section, Figure 5 being an end view of the outer section connection means, and Figure 6 being an end view of the inner section connection means.

Figure 7 is an expanded side view partially in section of yet another form of sectionalized electric contact stud which may be employed in the practice of this invention. The connection means illustrated in Figure 7 embodies a female portion in the inner stud section and an expandable male portion which is expandable by adjustment from the outer end of the contact stud outer section.

Figure 8 is an expanded side view partially in section of still another form of contact stud employing expandable connection means similar to that illustrated in Figure 7, but embodying slanting contact faces on the respective sections so that the face of the inner contact stud section may be flush to the stationary electrode casing when the inner section is imbedded in the electrode mass.

Figures 9, 10 and 11 illustrate an expanded side view partially in section and end views of the respective stud sections of still another form of sectional contact stud which may be employed in the practice of this invention. The connection means illustrated in Figures 9, 10 and 11 contemplates the placement of the inner stud sections in the electrode mass in a substantially horizontal position so that any tendency for the contact stud sections to separate while in operative relation is removed.

Figure 1:
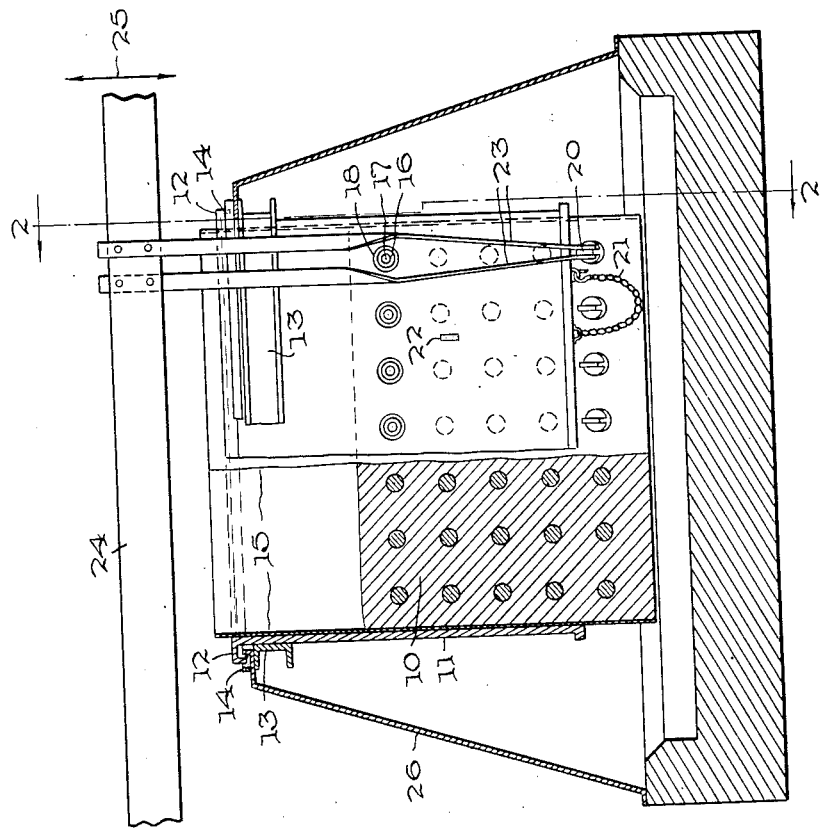
Figure 1 is a side elevational view of a portion of an electric furnace utilizing a self-baking electrode and embodying an exemplary form of the invention. The view of Figure 1 is taken generally on line 1—1 of Figure 2 with various parts shown in section.
Figure 2:
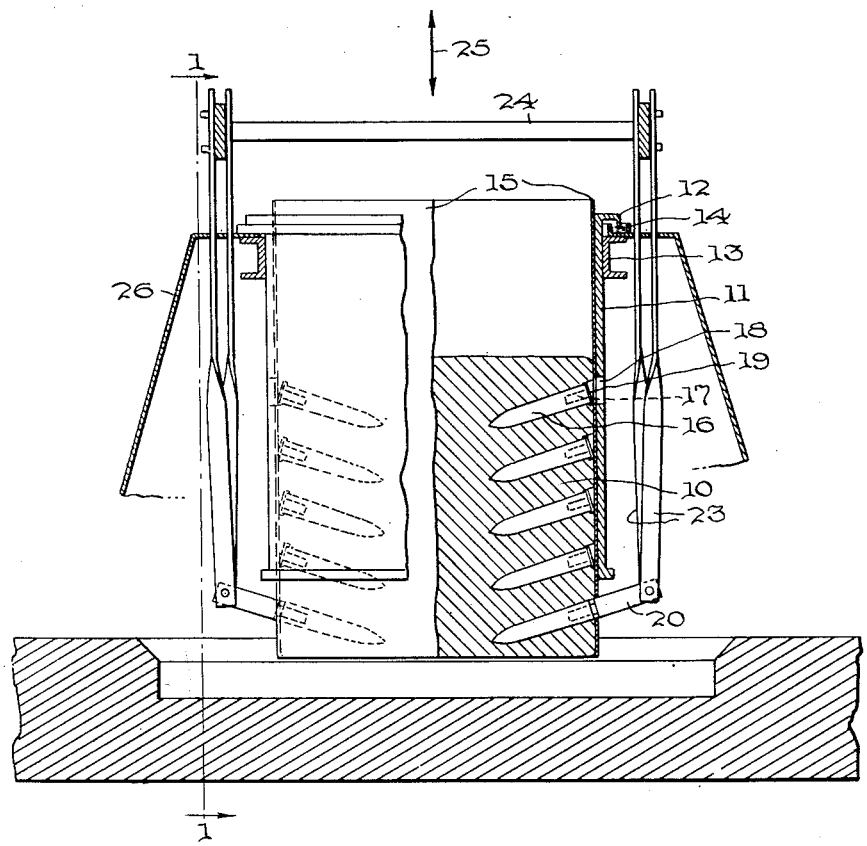
Figure 2 is an end elevational view of the partial furnace construction illustrated in Figure 1, generally along the line 2—2 of Figure 1 with various parts shown in section.

Referring again in Figures 1 and 2, the electrode mass 10 is supplied at the top of the electrode and is contained in a stationary casing 11 as the lower portion of the electrode is consumed and the electrode mass 10 is successively lowered. The stationary casing 11 is provided with a flange means 12, which serves to suspend the stationary casing 11 from the framework 13, the flange 12 resting on a suitable sandlock 14. A suitable inner casing 15, such as aluminum foil, may be provided between the electrode mass and the stationary casing to facilitate freedom of movement therebetween by reducing the tendency for the electrode mass 10 to adhere to the stationary casing 11. Inner casing 15 may be omitted, however, if desired. Contact stud inner sections 16 which have been provided with suitable connection means 17 are countersunk into the unbaked portion of the electrode mass 10. This countersunk arrangement may be accomplished by placing the inner sections 16 in position at the top of the electrode mass 10, thus eliminating the necessity of having any openings whatsoever in the sides of stationary casing 11, or by inserting the inner sections 16 through suitable apertures 18 provided in the stationary casing 11 at points where the lateral pressure of the unbaked mass is relatively low. During operation of the electric furnace and as the electric contact stud inner sections 16 progress downwardly as a result of movement of the electrode mass 10 and become baked in the electrode mass 10 by heat released in the lower portion of the electrode, the row of contact stud inner sections 16 emerge below the permanent casing 11. The contact stud inner sections 16 may be advantageously provided with a removable or destructible shielding means 19, such as an aluminum foil cap, in order to protect the connection means from any tendency of the unbaked portion of the electrode mass 10 to extrude into the connection means 17 while the contact stud inner section 16 is being baked in position. Such shield means may take the form of an aluminum foil cap or an aluminum disc with an upset portion to contact the sides of the female portion of the inner section to lock the shield means in place. Certain types of asphaltic pastes having the property of low volatility at high temperatures are likewise available to shield the connecting portion of the inner section. Similarly a plug portion made from suitable material, such as metal or wood, could be utilized. Moreover, the plug means could embody a sloping face to rest flush with the opposing stationary casing surface in much the same manner as does the sloping face 53 of inner section 44 as illustrated in Figure 8.

When the contact stud inner sections 16 emerge below the permanent casing 11, the shielding means 19 may be removed or destroyed and contact stud outer sections 20 connected to the contact stud inner sections 16 which have become baked in the electrode mass 10. During the downward travel of the electrode the lowermost row of contact studs become supported by auxiliary suspension means preferably depending from the stationary casing, such as a plurality of chain means 21, only one of which is illustrated on Figure 1 for the sake of clarity. When not in use as auxiliary suspension means, the chain means 21 may be removed from the operating area of the furnace, as by securing the free end of the chain means 21 to a suitable holding device mounted on the stationary casing, such as eye 22. With the lowermost row of contact studs supported by the auxiliary suspension means, the bus bars 23 may be detached from the lowermost row of contact studs and moved to new position adjacent the newly prepared row of studs, as by vertical adjustment of the master bus bar 24 as indicated at 25. On arrival in new position the bus bars 23 may be connected to the new row of contact studs and the electrode weight retransferred to the main suspension means operating through bus bars 23. Slight upward movement of the main suspension means will then release the auixlary suspension means 21 which is then removed from the operating area as by securing the free end of chain means 21 to eye 22 as previously explained, at which time the lowermost row of studs are removed in the usual manner.

The master bus bar 24 and the suspension bus bar 23 are vertically adjustable as indicated at 25 by suitable means such as a jacking system (not shown) similar to that disclosed in connection with Legeron Patent No. 2,169,563. Additional furnace features necessary for efficient operation of the electric furnace, such as hood means 26 and gas collecting and exhausting ducts (not shown), are well known in the art and have been omitted for the purpose of simplicity of illustration.

The connection means necessary between the contact stud inner sections 16 and the contact stud outer sections 20 may be of any suitable type which will impart sufficient strength and electrical conductivity properties to the resulting connection. As an example of a suitable connection means having the requisite strength and electrical properties, Figure 3 illustrates a threaded connection whereby the contact stud intersection 30 is provided with a female thread portion 31 and the contact stud outer section 32 is provided with a threaded male portion 33 and a suitable bus bar connection means 34 which may be in the form of an aperture or projecting bar-like portions. Though not essential, nut 35 may be utilized as at 36 to lock the threaded sections together in any desired relative rotational position to allow the bus bar connecting portion 34 to be in vertical position for connection with bus bars 23 irrespective of the relative rotational position of the contact stud inner section 30, while at the same time maintaining a pressure contact between the threaded portions 31 and 33 to ensure a good conductive contact through the connection.

Figures 4, 5 and 6 illustrate another form of suitable contact stud connection means wherein inner section 37 is provided with a female bayonet portion 38 which includes a stop ledge 39 and a locking cam surface 40 The outer contact stud section 41 is provided with a bayonet type male section 42, having a widened end portion and a suitable bus bar connecting portion 43 for connection of the contact stud to bus bars 23. Figure 5 illustrates an end view of the outer contact stud section 41 shown in Figure 4, showing the widened male end portion 42 of the connection means. Figure 6 illustrates an end view of the contact stud inner section 37 showing the widened hollow portion 43 suitable for insertion of the key portion 42 and showing in dotted line the female bayonet section 38 and stop means 39. In use this form of connection means will require the placement of the long dimension of opening 43 in horizontal position when the contact stud inner section 37 is countersunk in the electrode mass. Connection is accordingly accomplished by insertion of key portion 42 through aperture 43 followed by rotation of the outer contact stud section 41 through 90° to place the outer contact stud section in lock position and to allow the bus bars 23 to be connected to the outer contact stud section 41 as at 43.

Figure 7 illustrates yet another form of connection means wherein contact stud inner section 44 is provided with a recess 45 of preferably conical cross-section. The contact stud outer section 46 includes a male connection portion 47 made up of expandable sections 48 which when in connecting position are expanded against the sides of recess 45 of the inner section 44 by suitable means such as bolt 49 acting through bolt head 50 by pressure exerted as by tightening nut 51. Suitable connection means 52 are provided on the outer section 46 to allow connection of the outer section to suspension bars 23.

Figure 8 illustrates a form of sectional contact stud similar to that illustrated in Figure 7 in that a male expandable section is used to connect the outer section 46 to the inner section 44. Like parts in Figures 7 and 8 are numbered identically. The form of contact stud in Figure 8 differs mainly from that shown in Figure 7 by utilization of a sloped contact face between the inner section 44 and the outer section 46. Such sloping surface is advantageous in that the sloping face 53 of inner section 44 may be arranged to be substantially flush with the surface of stationary casing 11 while the inner sections are enclosed therein so as to prevent any tendency for the unbaked paste to flow from the electrode mass into the connection means 45. Sloping facing surface 54 on the stud outer section 46 when in connecting position will become flush with the sloping facing surface 53 of the contact stud inner section 44. The arrangement of Figure 8 also differs from that shown in Figure 7 by utilization of another type of suitable suspension bar connecting means as indicated at 55.

Figures 9, 10 and 11 illustrate yet another type of sectioned contact stud wherein the inner section 56 is provided with a female portion 57 of polygonal cross-section and the outer section 58 is provided with suitable suspension bar connection means 59 and the male portion 60 of matching polygonal cross-section. Use of this type of sectional stud contemplates the horizontal placement of inner section 56 in the electrode mass so as to obviate any tendency for the sections to separate when in operative arrangement. Figure 10 is a cross sectional view along the line 10—10 of the outer end section illustrated in Figure 9, showing an exemplary polygonal cross-section of the male portion 60. Figure 11 illustrates an end view along the line 11—11 of contact stud inner section 56 illustrated in Figure 9 and illustrates an exemplary polygonal cross-section of the female member 57.

According to conventional practice for the so-called horizontal stud arrangement, the contact studs are positioned in the electrode mass at an angle on the order of 20° with respect to the horizontal dimension as illustrated in Figures 1 and 2. Such downward disposition of the contact studs has been adopted so as to minimize the power loss in the electrode mass by reducing the distance between the inner end of the contact stud and the lower surface of the electrode. However, such slanting disposition gives rise to a tendency for the contact stud to be forced laterally away from the electrode mass by the action of the weight of the electrode mass. Placement of the contact studs in a truly horizontal position serves to remove the tendency for the contact sud to be forced laterally away from the electrode mass so that the structure of the contact stud sections may be simplified since they need not be locked against longitudinal separation when supporting the weight of the electrode mass. Such horizontal placement, moreover, need not materially increase the power loss in the electrode mass since the minimum average distance permissible between the surface of the contact stud and the lower surface of the electrode mass may be relatively reduced as a result of such placement.

It will be obvious that the various features and arrangements of sectional studs, stationary casing and suspension means disclosed are susceptible of wide application in the art. Though the electrode cross-sectional shape illustrated in Figures 1 and 2 is rectangular, it will be apparent such cross-section may be either circular or of other oblong configuration. A fewer or greater number of rows of countersunk inner contact stud sections than the five illustrated in Figures 1 and 2 may be utilized depending on the electrode height desired and the relative position of the unbaked portion of the electrode mass. Moreover, although the studs are shown in vertical alignment, the stud sections could be arranged as well in a staggered or alternating pattern. Similarly, other forms of suspension which operate directly from the frame structure may be utilized in lieu of or in conjunction with the auxiliary suspension chain means 21 and main suspension bars 23 without departing from the scope of this invention. Moreover, the bus bar connection means at the outer end of the outer section may take various forms other than those disclosed in Figures 3, 7 and 8 for example, such as protruding bars on the outer section cooperable with hook means on the suspension bars 23 or a surrounding sleeve arrangement mounted on the suspension bars to encircle the outer end section. Such surrounding sleeve connection means between the outer section and suspension bar would be particularly desirable in the stud form disclosed in Figures 9, 10 and 11 where the stud is arranged substantially perpendicular to the suspension bar, since such arrangement would have an inherent simplicity of construction and ease of manipulation.

Although as shown in Figure 2, aperture 18, for the insertion of the contact stud inner sections into the electrode mass has an axis perpendicular to the stationary casing, it will be apparent that such aperture 18 may have sloping sides to facilitate contact stud inner section insertion if desired. Moreover, the contact stud inner section 16 may be placed in position at the top of the electrode mass rather than being inserted into the sides thereof, thus eliminating the necessity of having any break whatsoever in the stationary casing side, if desired, thus further reducing the height and weight of the electrode mass.

It will be further apparent that due to the unbroken nature of the sides of the stationary casing, such casing may be externally ribbed in any manner desired if considerations of weight and strength render additional lateral support desirable.

What I claim is:

1. The combination of a self-baking electrode mass comprising an upper plastic or unbaked portion and a lower baked portion, a stationary casing surrounding said electrode, said casing being provided with a row of spaced apertures in that zone of the casing where the lateral pressure of the electrode mass is relatively low, said apertures adapted to receive inner contact stud sections therethrough, removable inner sections of two-part contact studs inserted through said apertures and embedded within the electrode mass in such manner as to provide successive horizontal rows of embedded stud sections along the vertical axis of said electrode, the outer ends of said inner contact stud sections being within said stationary casing but closely adjacent the wall thereof, each row of embedded contact stud sections being securely fixed therein as the electrode mass passes downwardly through said stationary casing and is progressively baked, and with the outer sections of the two-part contact studs adapted to be conductively connected to the outer end of the embedded inner stud sections as each row of said embedded stud sections emerges from the bottom of the stationary casing.

2. The combination as in claim 1 wherein primary suspension means are provided for detachable connection with the outer end portion of the outer sections of the two-part contact studs and auxiliary suspension means are provided for detachable connection with the outer section of the two-part contact studs at such time when the primary suspension means is being detached from the lowermost row of contact studs and connected to the outer section of the contact studs in the next higher row which has emerged from the bottom of the stationary casing.

3. The combination as in claim 1 wherein the outer end of the inner section of the two-part contact studs are provided with means for connection with the outer section, said means being in the form of recesses, said inner stud sections being provided with shielding members adapted to cover said recesses and to prevent any of the unbaked electrode material from extruding into said recesses during passage of the electrode mass and embedded stud sections downwardly through the stationary casing.

4. The combination of a self-baking electrode mass having an upper plastic or unbaked portion and a lower baked portion, a stationary casing surrounding said electrode, said casing having a plurality of spaced apertures around the periphery thereof in a plane perpendicular to the vertical axis of said electrode and being in that area of the casing where the electrode mass is plastic or unbaked, said apertures adapted to receive inner contact stud sections therethrough, removable inner sections of two-part contact studs inserted through said apertures and embedded in the electrode mass in such manner as to provide successive horizontal rows of embedded stud sections along the vertical axis of the electrode, the outer ends of said embedded stud sections being flush with the inner surface of said casing, each row of embedded stud sections being securely fixed in the electrode mass as it passes downwardly through said casing and is baked, and with the outer sections of the two-part contact studs adapted to be connected in current carrying manner with the outer end of the embedded inner stud sections as each row of said inner stud sections emerges from the bottom of the stationary casing.

5. The combination as in claim 4 wherein primary suspension means are provided for detachable connection with the outer end portion of the outer sections of the two-part contact studs and shielding means are provided on the outer ends of the inner embedded stud sections during passage of the electrode mass through said casing to prevent adherence of electrode material over said outer ends and thus insure good conductive connection between the inner and outer contact stud sections.

6. The combination of a self-baking electrode comprising an upper plastic or unbaked portion and a lower baked portion, a stationary casing surrounding said electrode, a plurality of removable inner sections of two-part contact studs embedded within the electrode in such manner as to provide successive horizontal rows of embedded stud sections along the vertical axis of said electrode, the outer ends of said inner contact stud sections within said stationary casing being closely adjacent the inner wall thereof, each row of embedded contact stud sections adapted to be securely fixed within the electrode as the electrode mass passes downwardly through said stationary casing and is progressively baked, and a plurality of outer sections of the two-part contact studs adapted to be conductively connected to the outer end of the embedded inner stud sections as each row of said embedded stud sections emerges from the bottom of the stationary casing.

7. The combination of a self-baking electrode comprising an upper plastic or unbaked portion and a lower baked portion, a stationary casing surrounding said electrode with said lower baked portion extending below the bottom of said casing, said casing having a plurality of spaced apertures in that zone of the casing where the electrode is plastic or unbaked, said apertures adapted to receive inner contact stud sections therethrough, removable inner sections of two-part contact studs inserted through said apertures and embedded within the electrode in such manner as to provide successive horizontal rows of embedded stud sections along the vertical axis of said electrode, the outer ends of said inner contact stud sections within said stationary casing being adjacent the inner wall thereof, each row of embedded contact stud sections adapted to be securely fixed within the electrode as the electrode mass passes downwardly through said stationary casing and is progressively baked, and a plurality of outer sections of the two-part contact studs conductively connected to the outer end of the embedded inner stud sections as each row of said embedded stud sections emerges from the bottom of the stationary casing.

References Cited in the file of this patent

UNITED STATES PATENTS

| Number | Name | Date |
|---|---|---|
| 317,154 | Lowrie | May 5, 1885 |
| 596,151 | Funcke | Dec. 28, 1897 |
| 881,519 | Wilson | Mar. 10, 1908 |
| 1,115,027 | Seabury | Oct. 27, 1914 |
| 1,357,564 | Hughes | Nov. 2, 1920 |
| 1,645,428 | Hosmer et al. | Oct. 11, 1927 |
| 1,686,474 | Soderberg | Oct. 2, 1928 |
| 1,757,695 | Westly | May 6, 1930 |
| 1,788,565 | Davis | Jan. 13, 1931 |
| 1,887,640 | Hickman | Nov. 15, 1932 |
| 1,912,560 | Wiles | June 6, 1933 |
| 2,034,051 | Lipp | Mar. 17, 1936 |
| 2,073,356 | Torchet | Mar. 9, 1937 |
| 2,159,183 | Sem | May 23, 1939 |
| 2,169,563 | Legeron | Aug. 15, 1939 |
| 2,337,279 | Sem et al. | Dec. 21, 1943 |
| 2,339,230 | Hagerup-Larssen | Jan. 11, 1944 |

FOREIGN PATENTS

| Number | Country | Date |
|---|---|---|
| 262,722 | Great Britain | June 9, 1927 |
| 608,475 | Great Britain | Sept. 15, 1948 |

OTHER REFERENCES

The Ford Model A Car (1930), by Page (Fig. 206, page 469). (Copy in Div. 26.)